(12) United States Patent
Ghassemzadeh

(10) Patent No.: US 7,923,413 B2
(45) Date of Patent: *Apr. 12, 2011

(54) LOST CIRCULATION MATERIAL FOR OILFIELD USE

(75) Inventor: Jaleh Ghassemzadeh, Grande Prairie (CA)

(73) Assignee: Schlumberger Technology Corporation, Sugar Land, TX (US)

( * ) Notice: Subject to any disclaimer, the term of this patent is extended or adjusted under 35 U.S.C. 154(b) by 74 days.

This patent is subject to a terminal disclaimer.

(21) Appl. No.: 12/468,232

(22) Filed: May 19, 2009

(65) Prior Publication Data

US 2010/0298175 A1 Nov. 25, 2010

(51) Int. Cl.
*C09K 8/22* (2006.01)
*C09K 8/74* (2006.01)
*E21B 33/13* (2006.01)

(52) U.S. Cl. .......................... 507/124; 507/269; 166/292

(58) Field of Classification Search .................. 507/104, 507/118, 269, 203, 124; 166/292, 293, 300
See application file for complete search history.

(56) References Cited

U.S. PATENT DOCUMENTS

| | | | | |
|---|---|---|---|---|
| 2,756,209 A * | 7/1956 | Morgan | ......................... | 507/104 |
| 2,799,647 A * | 7/1957 | Borcherdt | ..................... | 507/104 |
| 3,629,102 A * | 12/1971 | Lummus et al. | ............... | 507/104 |
| 4,422,948 A * | 12/1983 | Corley et al. | .................. | 507/104 |
| 5,377,760 A | 1/1995 | Merrill | | |
| 6,518,224 B2 * | 2/2003 | Wood | ............................. | 507/118 |
| 6,790,812 B2 * | 9/2004 | Halliday et al. | ............... | 507/269 |
| 7,066,285 B2 | 6/2006 | Shaarpour | | |
| 7,213,645 B2 | 5/2007 | Sweatman et al. | | |
| 7,226,895 B2 | 6/2007 | Xiang | | |
| 7,308,936 B2 | 12/2007 | Sweatman et al. | | |
| 7,311,147 B2 | 12/2007 | Sweatman et al. | | |
| 7,314,082 B2 | 1/2008 | Sweatman et al. | | |
| 2003/0195120 A1 | 10/2003 | Halliday et al. | | |
| 2004/0129460 A1 | 7/2004 | McQuoid et al. | | |
| 2004/0244978 A1 * | 12/2004 | Shaarpour | ..................... | 166/293 |
| 2005/0284666 A1 * | 12/2005 | Cowan | ............................ | 175/65 |
| 2006/0157248 A1 * | 7/2006 | Hoefer et al. | .................. | 166/300 |
| 2006/0272860 A1 | 12/2006 | Sweatman et al. | | |
| 2007/0017676 A1 | 1/2007 | Reddy et al. | | |
| 2007/0034410 A1 | 2/2007 | Xiang | | |
| 2007/0056730 A1 | 3/2007 | Keese et al. | | |
| 2007/0137528 A1 | 6/2007 | Le Roy-Delage et al. | | |
| 2008/0017376 A1 * | 1/2008 | Badalamenti et al. | ......... | 166/292 |
| 2008/0045421 A1 * | 2/2008 | Nelson et al. | .................. | 507/204 |

FOREIGN PATENT DOCUMENTS

| | | |
|---|---|---|
| WO | 2004076810 | 9/2004 |
| WO | 2004076812 | 9/2004 |
| WO | 2004101704 | 11/2004 |
| WO | 2006061561 | 6/2006 |
| WO | 2007007118 | 1/2007 |
| WO | 2008032049 | 3/2008 |

* cited by examiner

*Primary Examiner* — Timothy J. Kugel
*Assistant Examiner* — Aiqun Li
(74) *Attorney, Agent, or Firm* — David Cate; Robin Nava; Jeffrey Griffin

(57) ABSTRACT

A composition for reducing lost circulation in a well, while drilling the well with a drilling mud, which is composed of a base fluid, a mixture of particles, and a blend of fibers. The composition is used by stopping drilling with the mud, injecting a spacer, injecting the water-based composition, injecting a spacer, and resuming drilling with the oil-based mud.

11 Claims, 3 Drawing Sheets

LOST CIRCULATION MATERIAL FOR OILFIELD USE

BACKGROUND OF THE INVENTION

Drilling fluids have a number of functions, including but not limited to, lubricating the drilling tool and drill pipe which carries the tool, providing a medium for removing formation cuttings from the well to the surface, counterbalancing formation pressure to prevent the inflow to the wellbore of gas, oil, and/or water from permeable or porous formations which may be encountered at various levels as drilling progresses, preventing the loss of drilling fluids to void spaces and to permeable or porous formations, maintaining hole stability prior to setting the casing, minimizing formation damage, and holding the drill cuttings in suspension, especially in the event of a shutdown in drilling and interruption of pumping of the drilling mud.

Drilling fluid additives in time can form a thin, low permeability filter cake (mud cake) that can seal openings in formations to reduce the unwanted influx of fluids or the loss of drilling fluids to permeable formations. The mud cake forms when the drilling fluid contains particles that are approximately the same size as or have diameters greater than about one third of the pore diameter (or the width of any openings such as induced fractures) in the formation being drilled. Drilling fluid additives can also increase the stability of the wellbore.

The drilling fluid must circulate in the wellbore (down the drill pipe and back up the annulus) in order to perform all of the desired functions to allow the drilling process to continue. Therefore, drilling fluid should remain in the wellbore all the time, otherwise well control and caving in of the wellbore is immediate. Sometimes penetration of undesirable formation conditions causes substantial to severe losses of the drilling fluid to the formation. The features responsible for such losses can be related to small to large fissures, or natural or induced fractures in the formation; the losses may also be through highly porous rock.

Fluid loss is a common occurrence in drilling operations. Drilling fluids are designed to seal porous formations intentionally while drilling; this occurs as the result of suction of the fluid onto the permeable surface (pressure greater in the well than in the formation) and the creation of a mud cake to seal a porous formation during drilling and for the purpose of wellbore stabilization. Some fluid will be lost through the mud cake and fluid loss control additives are required.

However, the loss of fluids (the whole slurry) to the formation can reach an extent such that no mud cake can be created to secure the surface and create an effective barrier. In extreme situations, when the borehole penetrates a fracture in the formation through which most of the drilling fluid may be lost, the rate of loss may exceed the rate of replacement. Drilling operations may have to be stopped until the lost circulation zone is sealed and fluid loss to the fracture is reduced to an acceptable level. In the worst case, the consequences of this problem can be loss of the well.

Curing losses effectively and quickly is still a matter of concern for many companies and operators. The volumes of mud loss and the amounts of lost circulation material used are both very great. Over the years numerous techniques have been developed in order to cure or to reduce low to moderate lost circulation of mud to the wellbore. Under these conditions, the normal procedure is to add fluid loss agents. The mechanism is to change the Theological properties of the drilling mud in order to increase the resistance to flow of the fluid to the formation. This alone may decrease the losses while drilling to an acceptable level. However, when it comes to intolerable losses, it is now traditional to add various bulk materials known as LCMs. Such prior art lost circulation materials are selected from different groups of materials in the form of flakes (or laminated), granular, and fibrous materials. Materials commonly used are cheap wastes from other industries and they are not engineered to be effective at blocking the loss zone. Not all materials are capable of building a blocking material with low permeability. The material may not only be dislodged and allow further fluid loss, but also may not pack in the required way to be able to block losses. Regarding fibers, the situation is similar; not all fibers are capable of blocking fluid loss under given conditions, and selection and use of the wrong fiber can cause great complications in mixing and pumping and ultimately have no blocking effect.

Organic and inorganic, natural and synthetic fibers have also been used along with other particles and/or polymeric treatments. For example, in a cure for lost circulation, fibers were added to aqueous solutions of partially hydrolyzed polyacrylamide (U.S. Pat. No. 5,377,760). In another example, a high fluid loss spotting pill included a carrier fluid, a LCM containing acidizable mineral particulates, preferably calcium carbonate (fine and coarse particles and fine flakes) along with acid-soluble mineral fibers, preferably fine fibers such as extruded mineral wool having a diameter of 4 to 20 microns, preferably from about 5 to 6 microns and a length of fiber about 200 microns, preferably 8 to 25 microns (US 2003/0195120 and U.S. Pat. No. 6,790,812). In yet another example, a loss circulation combination contained alkali metal silicate and water-insoluble particulate material as an integral component of a water-based drilling fluid system and a quantity of water-soluble activating agent effective to reduce the pH of the water-based drilling fluid system low enough to cause precipitation of the silicate; the water-insoluble particulate materials included cellulose fibers selected from corn cobs, nut shells, seeds, pith, and lignin and had sizes from about 0.025 to about 2 mm (about 10 to about 500 mesh) (US 2007/0034410 and U.S. Pat. No. 7,226,895). Coconut coir in the form of a mixture of short fibers, flakes, granular pieces, and powder from the coconut husk has been used as an LCM in drilling fluid to prevent loss of drilling fluid into fractures in rock formations (US 2004/0129460). Finally, glass fibers or novoloid fibers in an amount of 1.43 to 17.12 kg/m$^3$ (0.5 to 6 lb/bbl) have been mixed with solid particles of less than 300 microns (WO 2004/101704 and US 2007/0056730).

Despite all these efforts, there is still a need for a precisely engineered material that can quickly and efficiently reduce severe lost circulation, and that can build a strong barrier in the loss zone, in wells being drilled with oil-based muds.

SUMMARY OF THE INVENTION

One embodiment is a water-based composition for reducing lost circulation while drilling a well with an oil-based drilling mud. The composition includes an aqueous base fluid, a mixture of coarse, medium and optional fine particles, and a blend of long fibers and short fibers. At least a portion of the medium particles or coarse particles or both swells in the presence of the oil-based drilling mud. The optional fine particles preferably have an average particle size of from about 5 to about 15 microns, the medium particles preferably have an average particle size of from about 20 to about 150 microns, and the coarse particles preferably have an average particle size of from about 300 to about 2500 microns. The mixture of particles includes from about 0 to about 15 weight percent fine particles, about 20 to about 40 weight percent medium particles, and about 40 to about 60 weight percent coarse particles. Optionally, at least about 60 weight percent of the mixture of particles is acid-soluble. Optionally, the long fibers are rigid and the short fibers are flexible. By a rigid fiber, is meant in the present context, a fiber having a Young's Modulus greater than about 20 GPa, preferably from about 20 to about 50 GPa, and most preferably from about 29 to about 45 GPa. By a flexible fiber, is meant a fiber having a Young's Modulus lower than about 20 GPa, preferably greater than about 0.1 and less than about 20. Optionally, the weight ratio of long fibers to short fibers is from about 1:4 to about 4:1. Long fibers preferably have a length of from about 6 to about 20 mm, preferably from about 8 to about 15 mm. Short fibers preferably have a length of from about 0.5 to about 8 mm, most preferably from about 1.5 to about 6 mm. Long fibers preferably have a diameter of from about 40 to about 700 microns, preferably from about 100 to about 200 microns. Short fibers preferably have a diameter of from about 5 to about 40 microns, most preferably from about 11 to about 15 microns. Optionally, at least a portion of the fibers is acid-soluble. In a preferred embodiment, the long fibers include water-insoluble polyvinyl alcohol and the short fibers include water-soluble polyvinyl alcohol. In a more preferred embodiment, the long fiber is polyvinyl alcohol and the short fiber is an inorganic fiber. Optionally, the short fibers include a mixture of fibers of two different lengths. Optionally, both the long fibers and the short fibers include polyvinyl alcohol fibers. Optionally, the aqueous base fluid is a drilling mud. Optionally, at least one of the long fibers and the short fibers is at least partially composed of a metal.

Another embodiment is a water-based composition for reducing lost circulation while drilling a well with an oil-based drilling mud. The composition includes an aqueous base fluid, a mixture of coarse, medium and optional fine particles, and a blend of two different rigid fibers. The different rigid fibers include fibers of different lengths or different diameters or different compositions, wherein at least a portion of the medium particles or coarse particles or both swells in the presence of the oil-based drilling mud.

Yet another embodiment is a method of reducing lost circulation in a well, while drilling with an oil-based drilling mud. The method involves injecting a first spacer, then injecting a water-based composition including an aqueous base fluid, a mixture of coarse, medium and optionally fine particles, and a blend of long fibers and short fibers, in which at least a portion of the medium particles or coarse particles or both swells in the presence of the oil-based drilling mud, and then injecting a second spacer into the well. The first spacer may include a surfactant.

A further embodiment is a method of reducing lost circulation in a well, while drilling with oil-based drilling mud. This method involves injecting a first spacer, then injecting a water-based composition including an aqueous base fluid, a mixture of coarse, medium and optional fine particles, and a blend of long fibers and short fibers, in which at least a portion of the medium particles or coarse particles or both swells in the presence of the oil-based drilling mud, into the well. The concentration or the length of the long fibers may initially be zero and may be increased during the injection. Then a second spacer is injected into the well. The first spacer may include a surfactant.

DETAILED DESCRIPTION OF THE INVENTION

Figure 1:
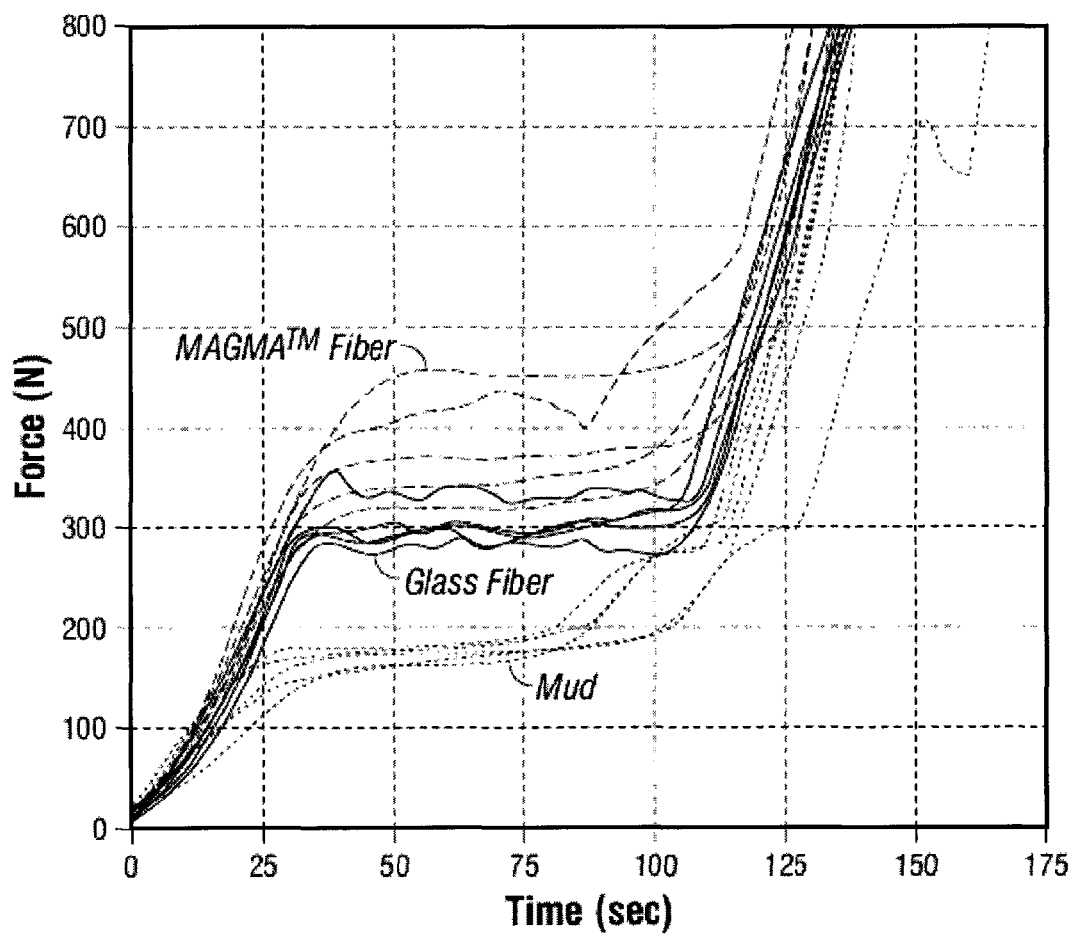
FIG. 1 illustrates the injection force required to deform mud cakes formed by a bentonite mud cake and bentonite mud cakes prepared with different fibers added.

It should be understood that throughout this specification, when a concentration or amount range is described as being useful, or suitable, or the like, it is intended that any and every concentration or amount within the range, including the end points, is to be considered as having been stated. Furthermore, each numerical value should be read once as modified by the term "about" (unless already expressly so modified) and then read again as not to be so modified unless otherwise stated in context. For example, "a range of from 1 to 10" is to be read as indicating each and every possible number along the continuum between about 1 and about 10. In other words, when a certain range is expressed, even if only a few specific data points are explicitly identified or referred to within the range, or even when no data points are referred to within the range, it is to be understood that the inventor appreciates and understands that any and all data points within the range are to be considered to have been specified, and that the inventor has possession of the entire range and all points within the range.

We classify losses in four categories. Seepage losses happen very slowly and can be confused with cutting removal at the surface. Seepage losses sometimes happen in the form of filtration to a highly permeable formation. They are characterized by losses of from about 0.16 to about 1.6 m$^3$/hr (about 1 to about 10 bbl/hr) of mud. If formation damage or stuck pipe is the primary concern, attempts should be made to cure losses before continuing with drilling. Losses greater than seepage losses but less than about 16 m$^3$/hr (about 100 bbl/hr) are defined as partial losses. In almost all circumstances when losses of this type are encountered, regaining full circulation is required. Losses of mud at rates greater than about 16 m$^3$/hr (about 100 bbl/hr) are considered severe losses. As with partial losses, regaining full circulation is required. Traditional treatments for severe losses include spotting of conventional LCM pills and moving to plugs if conventional treatments are not successful. The fourth category is total losses.

For losses of whole mud to a pore or fracture to occur, the pore or fracture openings must be larger than about three times the maximum particle size in the mud. Losses may start to occur if the mud solids content is low and the particle size distribution is not suitable to form a filter cake. Losses typically start if pores in a rock matrix have a permeability of about 10 to 100 Darcies (which is equivalent to coarse sand or gravel).

We have found a composition and method that is suitable for eliminating losses ranging from seepage losses to severe lost circulation in a drilling operation, by blocking flow into permeable and/or fractured formations while drilling with oil-based muds. In the context of the present disclosure, oil-based fluids encompass oil-external emulsions, also known as invert emulsions or water-in-oil emulsions.

Fractures having openings or pinch points as large as about 3 to 5 mm may be treated. One of the objectives is to prevent further losses while using less lost circulation material and facilitating creation of a conventional mud cake that is crucial to protecting the wellbore so that the drilling process can be continued.

With the method and composition of the Invention, a water-based pill or treatment can be used to cure losses in a wellbore drilled with oil-based mud so that drilling with the more-expensive oil-based mud is then continued. The treatment for loss prevention involves a blend of solid particles, at least some of which are oil-swellable, and a mixture of at least two different fibers, at least one of which is rigid and that have different aspect ratios and/or flexibilities; these components are added to an aqueous base fluid to create a water-based pill, or alternatively, a portion of these components is added to a water-based mud or to another treatment fluid. The suitability of a base aqueous fluid may be determined by experiments such as those described here after. The rigid fibers initially create an effective three dimensional heterogeneous mesh across a fracture or across the face of a permeable formation; subsequently this mesh is blocked by the short flexible fibers and the blend of solid particles. Further, the fine particles of the treatment fluid of the Invention (if they are present), and/or fine particles in the oil-based mud when drilling is resumed, create an internal filter cake that blocks the fracture or permeable formation further. Additionally, when drilling is resumed the oil-swellable particles absorb oil that has leaked off through the internal structure of the loss zone from the oil in the oil-based mud; the oil-swellable particles swell and create more internal pressure and they compact and block the fracture or permeable formation further against leakage of oil and fluid loss. The short fiber(s) and appropriately selected particles give strength and resistance to deformation to the internal filter cake generated by the initial network of rigid fibers. With the present water-based treatment, wider fractures can be treated compared to the use of the same components at the same concentrations if they were used in an oil-based treatment. Furthermore, lower solids volume fractions are effective compared to other compositions and methods.

The composition and method do not require a pH or temperature change. The composition and method are particularly applicable to wells having partial losses or severe losses. In the latter case the composition and method provide, in a first (primary) treatment, a cure for severe losses. For greater assurance of a permanent and complete treatment, it is convenient for a driller then to place a second treatment, such as a cement plug, because there is the possibility of fracturing the loss zone as a result of drilling operations or of an increase in mud weight. In that case the composition and method according to the invention assure that the second treatment is effective.

It should be noted that the treatment is normally not intended to strengthen the entire length of a weak formation zone. Additional benefits of the primary plugging by the (first) treatment of the Invention are inter alia lower total treatment cost, less damage to the formation that would have caused a decrease in the stability of the formation, effective decrease of the expensive oil loss through leakage in the loss zone, and decreases in further problems that may otherwise appear because of delays in treatment.

An advantage of oil-based muds used for drilling are their lubrication properties that decrease the friction factor while drilling; however this lubrication makes it more difficult to block lost circulation pathways with an oil-based treatment because it would increase the likelihood that the blocking material could move. Therefore, methods and compositions that use oil-based systems to cure losses can block only small fractures and require high solids contents. Therefore, the composition and method of the invention use materials that swell in the presence of the oils used in the formulation of oil-based muds. The treatment is a water-based pill that should preferably be sandwiched between two spacers to delay particle swelling until the pill has been placed. The pill is preferably a water-based treatment that may be a suitably altered water-based mud or any suitable slurry that is formulated with fibers and solid particles as described herein. The spacer ahead of the pill may be designed to clean the surface and both the head and tail spacers may be used as barriers to prevent interaction between the oil-based mud and the pill. The method and composition of the invention use a treatment that is not mixed with the oil-based mud; thus the oil-based mud is not deteriorated and the pill may be placed, and stays in place, while exposed to oil-based mud. The swellable particles embedded in the structure of the blocking material expand and compact the area of flow further upon eventual contact with the oil-based mud, holding the material tightly in place, and not only counteract the leakage and lubricating effects of the oil in the oil-based mud, but also create a blocking material that resists invasion of the oil-based mud and possible deformation due to the pressure applied in the well by an increase in the confined pressure in the fracture or fractures. The final blockage is definitely stronger than a filter cake formed by an oil-based mud.

In the present invention, the spacers act as buffers between the mud and the pill slurry to prevent contamination of the pill by the oil based or invert emulsion mud. They also ensure that there is a water wet surface (not lubricated by oil), for placement of the treatment, on which the fibers and particles build a network so that later on, during the leakage of oil through the structure, the oil swellable material expands and compacts the structure in the pores (most likely in the pore throats) or fracture walls. The lead (head) spacer preferably contains a surfactant so that it has a cleaning effect on the surface; the tail spacer preferably is without surfactant and works to isolate the treatment to avoid contamination of the pill and acts as a barrier to avoid activation of the oil-expandable particles before placement. The surfactant should be selected to be compatible with the oil.

The spacers preferably include additives such as anti-foam agents (for example siloxanes, silicones and long chain hydroxy compounds such as glycols), viscosifiers such as polymers and viscoelastic surfactants, fluid loss additives, weighting agents such as barium sulfate, calcium carbonate or hematite, and extenders such as bentonite, and sodium silicates. The lead, first, spacer will be exposed to, and should be able to remove, various types of oil based muds including invert muds, synthetic muds, and diesel or other oil based muds, so this spacer should contain one or more surfactants. The surfactants may be, for example, non-ionic surfactants such as fatty acid diethanolamides, salts of alkyl benzenesulfonic acids, and ethoxylated or propoxylated short chain alcohols.

Optionally, when drilling is resumed after placement of the pill and spacers, a different oil-based drilling mud may be used.

The treatment of the Invention may further contain shale inhibitor additives when drilling in water-sensitive active shale, swelling shale and clay formations that should not be exposed to water-based treatments because of the potential of swelling of the formation and sloughing of the formation material. Such formations are typically drilled with oil-based drilling fluids and lost circulation treatments in such zones normally are water-free. Some or all of the components used to formulate the pill may be pre-mixed and added in one batch or may be added individually. For example, all the components except for the shale inhibitor may be premixed for addition to a base fluid, and shale inhibitor may be added only if the formation is water-sensitive.

The oil activated pill treatment may be placed in two portions, that we will designate the head and tail. The head pill may contain no rigid fiber or a low concentration of rigid fibers, for example less than 50 percent of the original concentration of rigid fibers used in a single-stage treatment; because of this there is a controllable depth of invasion of the treatment to strengthen a specific zone of the wellbore or to block the loss zone at a minimum, for example, at two bottlenecks of the fracture. The tail pill has a similar or different formulation except that it also contains the rigid fiber content required to plug the fracture effectively and to resist oil-based mud invasion close to the wellbore.

In one embodiment, the composition comprises blends of (a) at least two different fibers having specific and distinguishable individual characteristics along with (b) a specific blend of two or three different particle size ranges of particulate solids, in which at least one of the particulate solids in the blend is expandable. One benefit of this treatment is that the solid content, expandable particulate solid content, and fiber content can be adjusted and evaluated with the oil-based drilling mud and the water-based carrier used in the treatment and the time to effective blockage as the result of the expansion of the swellable material may be adjusted in the laboratory and/or in the field.

A number of different systems have been tested and a highly preferred embodiment involves a blend of at least two fibers having very different aspect ratios and flexibilities in combination with a specific blend of three sizes of solid particles. The presence of the fibers creates an effective three dimensional heterogeneous network that can be blocked effectively by solids having appropriate particle sizes for further forming a strong impermeable mud cake after activation (swelling). In addition, fine flexible fibers have a strengthening effect on the generated internal mud cake that further consolidates the entrance of a fracture or of the pore throats of permeable or unconsolidated formations during creation of an internal filter cake as the result of leakage to the walls of the fracture. There is no need for the mud or the mudcake to gel or to set (as would a cement).

The fibers and solids are added to the treatment fluid, which may be a drilling fluid (mud), for example a water-based drilling fluid, in any order and with any suitable equipment to form the treatment fluid. Typically the fluid containing the fibers and solids is mixed before pumping downhole. The blend of fibers may be added and mixed and then the mixture of solids added and mixed, or vice versa, or both fibers and solids may be added before mixing. Optionally, the fibers and/or solids may be added while pumping on the fly, for example with special shakers. Typically, the treatment fluid and the spacers are weighted to approximately the same density as the drilling mud to minimize migration of the treatment fluid and mixing with the drilling mud. A weighting material may optionally be added to the fluid, the fibers, or the solids at any point. The treatment fluid may be added in a discrete amount, for example as a pill, or may be added until lost circulation is satisfactorily reduced. The treatment fluid is preferably spotted adjacent to the location of the lost circulation, if known, by methods known in the art.

The mixture of particles and blend of solids may be injected in several stages in which the relative amounts of total particles, expandable particles, long fibers, and short fibers varies from stage to stage. Optionally, the length of the long fibers may also be less than optimal and then be increased to the optimal length during the treatment. For example the concentration of long fibers may be selected in the range of zero to a lower-than-optimal concentration of fiber in the first stage or stages of the treatment. A suitable low concentration may be determined by measuring the minimal effective blocking concentration of the blocking material for a specific fracture size and then using a concentration in the range of about 10 to about 90 percent of that minimal effective blocking concentration. For example, if the effective concentration of the rigid fiber to cure a 2 mm fracture is about 8.56 kg/m$^3$ (about 3 lb/bbl) then the low concentration may be selected from the range of about 0.856 to about 7.70 kg/m$^3$ (about 0.3 to 2.7 lb/bbl) of the rigid fiber. The low concentration selected should preferably be tested in the same equipment to validate the non-blocking effect of the treatment. In this preferred embodiment, the treatment with low concentration of the rigid fiber is followed with a treatment with an effective concentration of fibers capable of rapid blockage. As a result, treatment with the effective concentration blocks the fracture at or near the wellbore and the low concentration rigid fiber plugs the fracture at a bottleneck deeper in the fracture. In another embodiment, the short fiber and rigid fiber concentrations may be decreased by a certain percentage that experimentally may be determined based on the concentration of fibers in an effective fiber concentration for blocking a certain fracture size. The concentrations of the fibers in the first fluid may, for example, be from about 5 to about 50 percent less than the effective minimal concentration of fibers. The concentrations of each fiber type may be reduced by the same amount or by different amounts. In yet another case, in addition to a change in the fiber concentration, the amount of the solid particles may also be decreased. The low concentration treatment may be designed in such a way that it blocks certain fracture sizes lower than the original fracture size. For example, the low concentration treatment may be designed to treat a 1 mm fracture and the following treatment may be designed to treat a 4 mm fracture. For example, for a 1 mm bottleneck in a fracture, using zero to a low concentration of rigid fibers may be sufficient. When any of these strategies is followed, the treatment forms the blockage at least at two different depths in a fracture or in pores (one close to or at the wellbore and another at a different depth in the fracture or pores away from the wellbore) rather than only at the wellbore or close to the wellbore.

A suitable blend of fibers, solids, and expandable solids should be selected for a given drilling mud and given conditions, such as but not limited to the mud composition, the bottomhole temperature and the extent of losses being experienced. An effective concentration of each component, or a range of effective concentrations, may be identified by performing experiments such as those described below. Similarly, suitable compositions of particles and fibers, and suitable particle size ranges and fiber lengths may be identified by performing experiments such as those described below.

The composition and method of the Invention may be used in any density mud; preferred densities are from about 1.1 to about 2.0 kg/L (about 9.2 to about 17 pounds per gallon (ppg)). The solids volume fraction may range from about 4 percent to about 50 percent. The amounts and type of particles and fibers added may be chosen in a way that the added components do not change the mud weights or solids volume fractions very much. As high a particle concentration and/or as high a fiber concentration as can be handled by the on-site equipment may be used to help minimize penetration of the treatment fluid into the fluid loss pathway. For example, in cases in which the pill is added through only a drill pipe without a drill bit, the total concentration of fibers and particles may be limited only by the fluidity of the pill, that is, the ability to pump it. That total concentration is different for different muds and may be determined by simple experiments. The total solids concentration is typically between about 2.85 and about 285 kg/m$^3$ (about 1 and about 100 lb/bbl), preferably between about 2.85 and about 142.5 kg/m$^3$ (about 1 and about 50 lb/bbl), and most preferably between about 8.55 to about 85.5 kg/m³ (about 3 and about 30 lb/bbl).

Water-based muds are typically slurries of clay solids and polymers; the concentrations and densities are adjusted to provide the specific properties required for drilling, well protection, temperature control, and the other mud functions. Water-based muds may be used as the base fluids for the treatment fluids of the Invention (with suitable adjustment of the amounts of the components of the particulate solids blend to account for the solids already in the mud). Oil-based muds may contain diesel, poly alpha olefins, modified esters and ethers, mineral oils, other hydrophobic materials, and mixtures of these. Oil-based muds may also be invert emulsions of oil in which up to 50% water is dispersed in the oil; the oil is the external phase and water is the internal phase.

The blend of solid particles preferably consists of coarse, medium, and optionally fine particles. Preferably, the medium particles have an average particle size about 10 times that of the fine particles and the coarse particles have an average particle size of at least 10 times that of the medium particles. The coarse particles in the blend are preferably coarse carbonates having an average particle size above about 300 microns and less than or equal to about 2500 microns. For example, the particle size distribution may be centered around about 700 to about 1000 microns. The medium size particles are optionally composed of from about 1 to about 100 percent poly-paraphenyleneterephthalamide powder, available from Teijin Aramid Company, Arnhem, The Netherlands. Part or all of the medium size particles materials may be selected from particles used in oilfield fluids, such as mica, calcium carbonate and cements. Calcium carbonate particles having an average particle size of about 130 microns may be used. The medium particles preferably have a particle size distribution from about 25 to about 150 microns, more preferably from about 50 to about 100 microns. The medium particles may also be a mixture, for example a mixture of calcium carbonate and poly-paraphenyleneterephthalamide. The fine particles are preferably microfine carbonate particles having sizes below about 10 microns or having a particle size distribution from about 5 to about 15 microns. The principle purpose of the fine particles is to facilitate metering and handling of the blend; the fine particles may be left out if the equipment can handle the blend of medium and coarse particles. If the fine particles must be used and can invade small formation pores, preferably non-damaging particles should be used. The ratio of the coarse/medium/fine particles is preferably about 55/35/10 weight percent. The coarse particles may vary from about 40 to about 60 percent of the mixture of particles; the medium particles may vary from about 30 to about 60 weight percent of the mixture of particles, preferably from about 20 to about 40 weight percent; the fine particles may vary from about 0 to about 15 weight percent of the mixture. If there are no fine particles, the coarse particles are preferably present at from about 50 to about 80 percent of the mixture, although the ratio of coarse to medium particles may vary from about 30:70 to about 70:30. The carbonate is preferably calcium carbonate. The particles may be selected by one skilled in the art from any types of particles used in muds.

The solid materials are selected from rigid and/or flexible, fine to coarse in one two or three size ranges, acidizable and/or nonacidizable, resilient and/or non-deformable particles. Non-limiting examples of other suitable particles for use as components of the blend of solid particles include mica, rubber, polyethylene, polypropylene, polystyrene, acrylonitrile butadiene, pre-crosslinked substituted vinyl acrylate copolymers, polyaramid, poly(methyl methacrylate), poly(styrene-butadiene), fly ash, silica, mica, alumina, glass, magnesium carbonate, iron carbonate, dolomite, marble, barite, graphite, ceramic, metals and metal oxides, resins (for example melamine resins) starch and modified starch, hematite, ilmenite, microspheres, glass microspheres, magnesium oxide, gilsonite, and sand. The solid particles are preferably hydrophilic. Mica is particularly suitable because it provides substantial friction. Cements, silicates, and microcements are not normally used as one or more of the particles, but may be. If cement is present, it is less than about 50 weight percent, for example less than about 45 weight percent, of the weight of the particles. The particles are not normally in flake or platelet form, but may be. Laboratory tests should be performed to ensure compatibility with the drilling fluid, that the particles do not affect the fluidity of the mud, that the fluid can transport the particles at the pumping rates used, and the particle size suitability for the size of the openings in the fluid loss pathways to be plugged.

The oil-swellable particles may be present at a concentration of from about 30% to about 100%, preferably from about 50 to about 100% by volume of the coarse particles. Optionally, the oil-swellable particles may be present at a concentration of from about 30% to about 100%, preferably from about 50 to about 100% by volume of the total particles. The optimal concentration may be determined by laboratory tests similar to those described below in the examples, increasing the concentration of swellable particles until the desired results are obtained.

Oil swellable materials which swell when in contact with oil include neoprene rubber, natural rubber, nitrite rubber, hydrogenated nitrite rubber, acrylate butadiene rubber, poly acrylate rubber, butyl rubber, brominated butyl rubber, chlorinated butyl rubber, chlorinated polyethylene, styrene butadiene copolymer rubber, sulphonated polyethylene, ethylene acrylate rubber, epichlorohydrin ethylene oxide copolymer, ethylene-propylene-copolymer (peroxide cross-linked), ethylene-propylene-copolymer (sulphur cross-linked), ethylene-propylene-diene terpolymer rubber, ethylene vinyl acetate copolymer, fluoro rubbers, fluoro silicone rubber, silicone rubber, styrene-butadiene elastomer, styrene-butadiene-styrene elastomer, acrylonitrile-styrene-butadiene elastomer, ethylene-propylene-diene elastomer, alkylstyrene, polynorbornene, resin such as precrosslinked substituted vinyl acrylate copolymers, polymers of styrenes and substituted styrenes, polyvinyl chloride, copolymers of vinyl chloride such as a copolymer of 60 weight percent vinyl chloride and 40 weight percent vinyl acetate, polymers and copolymers of vinylidene chloride including a copolymer of 75 percent vinylidene chloride and 25 percent acrylonitrile, acrylic polymers such as polymers of methylmethacrylate, ethyl acrylate; polymers containing alternating units of at least two polymers selected from styrene, pentadiene, cyclopentadiene, butylene, ethylene, isoprene, butadiene and propylene; diatomaceous earth, and mixtures of these materials. Particularly suitable oil-swellable particles include cross-linked alkyl styrene beads (for example those available from Imtech Imbibitive Technologies Corp, under the name of IMBIBER BEADS™ having a particle size of from about 200 to about 300 microns); poly[2,2,1]bicycloheptene(polynorbornene) (for example NORSOREX™ APX1 or NORSOREX™ NS powders that are hydrophobic and oleophilic, have a low density (0.96 g/cm³), and are insoluble and inert in water, available from Atofina, Memphis, Tenn., USA, or INIPOL™ AB40 available from CECA, Paris, France); ground rubber (typically containing some carbon black) obtained by recycling tires, for example available from ATR (American Tire Recyclers, East Point, Ga., USA) or as ECORR™ RNM 45 available from Rubber Resources B.V. Maastricht, The Netherlands) having a density of from about 1.1 to about 1.2 g/cm$^3$; or precrosslinked substituted vinyl acrylate copolymers (such as the PLIOLITE™ family developed by Eliokem, Akron, Ohio, USA).

The blend of fibers preferably contains fibers having different aspect ratios, different length ratios, and different flexibilities. The blend is most commonly a blend of two fibers, or a blend of three fibers but blends of more fibers may be used. The fibers may optionally be a blend of different lengths of fibers. Preferably, at least one fiber type is rigid and the rest of the fibers are flexible. Preferably, the rigid fibers are longer than the flexible fibers. The length of the longest fibers is limited only by the ability of the on-site equipment to accommodate and move the fibers, mix the fibers and fluid, and pump a fluid containing the fibers. Long rigid fibers may be effective alone at sufficient concentration for blocking some fluid loss pathways, but their efficacy is improved by the addition of short fibers; these may also be rigid but are more effective if flexible. Note that we define a "flexible" fiber as having a Young's Modulus of less than about 20 GPa (kN/mm$^2$), for example from about 0.1 to less than about 20, and a rigid fiber as having a Young's Modulus of greater than about 20 GPa, preferably from about 20 to about 50, and most preferably from about 29 to about 45. Note that the fiber lengths specified are not intended to be precise; fibers as received, or as cut to length, inevitably are a mixture of lengths distributed around the intended length. The fibers are preferably selected from mineral fiber, glass fiber, polypropylene fiber, polyester fiber, polyaramide fiber, polyethylene fiber, polyolefin fiber, polylactic acid fiber, polyvinyl alcohol fiber or copolymers of any of the listed monomers. The fibers should be selected so that they do not interfere with the flow of the fluid that contains the blend of particles. Either the flexible fibers, or the rigid fibers, or both, may be oil-swellable.

The blend of fibers is typically added to the pill in a concentration of from about 2.85 to about 42.8 kg/m$^3$ (about 1 to about 15 lb/bbl). The weight ratio of long rigid fibers to short flexible fibers is typically from about 1:5 to about 5:1.

Optionally, suitable wetting agents may be used to ensure that the materials are water-wettable in the water-based treatment fluid. An advantage of polyvinyl alcohol fibers is that they are wet by both water and oil. However many other fibers do not have this property. For the others, such as glass fibers or other polymer fibers, it would be advantageous to use a water wetting surfactant. Note that some types of fibers, for example polyaramids are available in either water-wettable or oil-wettable form.

In a preferred embodiment for water-based pills, the blend of fibers is composed of two types of fibers. One type of fiber is rigid and the other is flexible. The rigid fiber is preferably non-water-soluble polyvinyl alcohol. The second fiber may be selected from inorganic or organic fibers. The second fiber may itself be a mixture of fibers having the same diameter with different lengths or may have a single fixed fiber length and preferably may be selected from aramid polymers suitable for aqueous media and water-soluble polyvinyl alcohol polymers which are water-soluble at high temperature.

In another preferred embodiment for water-based pills, the blend of fibers is composed of three fibers in which one fiber is an organic rigid long fiber and the other two fibers are inorganic and/or organic fibers—preferably both being organic fibers—having different lengths. For example, the two short fibers may have a length ratio of from about 2 to about 6, preferably from about 2.5 to about 4, and the length ratio of the long rigid fiber to the longest short flexible fiber may be from about to 2 about 6, preferably from about 2.5 to about 4. The length ratio of all rigid to all flexible fibers may optionally be from about 10:90 to about 90:10. The fibers are generally cut to the appropriate lengths, by any method known in the art, from the as-received materials to provide the desired lengths. Note that fibers may be described here as "water-soluble", "non-water-soluble", or "water-insoluble" because that is how they are described by manufacturers and suppliers; water solubility or insolubility is not important to the Invention provided that the fibers do not dissolve under bottomhole conditions before a mat or web of fibers has formed and trapped the mixture of particles. In fact, fibers described by a manufacturer as insoluble may be insoluble at room temperature but dissolve within a few minutes at downhole temperatures; this may be advantageous if the mudcake is later to be removed. For polyvinyl alcohol fibers, the temperature at which they dissolve in water may be increased by about 10° C. by preparing the pill at high pH.

In another embodiment for water-based pills, the blend of fibers is a blend of two different rigid fibers, for example water-insoluble polyvinyl alcohol. The two different fibers may differ in length (for example one may be about 8 mm and the other about 12 mm or one may be about 6 mm and the other about 12 mm), in diameter (for example selected from about 40, about 100 and about 200 microns), or in rigidity (tensile strength).

In one embodiment for water-based pills, preferred fibers are acid-soluble fibers that have good performance in highly alkaline environments. Formations having even severe losses can thus be treated with water-based systems. We define acid-soluble as soluble in an aqueous acid solution commonly injected into wells in the oilfield, for example formic acid, acetic acid, citric acid, hydrochloric acid (for example 3 percent or 15 percent), or mixtures of these. The fibers are therefore subsequently removable with HCl, for example 15% HCl, if it is desirable to remove the mud cake. When some or all of the particulate solids includes carbonate solids, they are generally too acidizable. In general, the higher the content of particulate solids, the more effective is the mud cake at blocking fractures and high permeability or unconsolidated regions.

One preferable long rigid organic fiber for water-based pills is a non-water-soluble polyvinyl alcohol fiber. The length of these (and other rigid) fibers is preferably in the range of about 10 to about 15 mm, more preferably about 12 mm. The diameter of these fibers is preferably about 0.04 mm to 0.2 mm, the tensile strength preferably about 1000 N/mm$^2$ (1.0 GPa), and the elongation preferably about 8 KN/mm$^2$. Preferred polyvinyl alcohol fibers have a thermal decomposition temperature typical of bottom hole conditions, for example around 220° C.; at this temperature the polyvinyl alcohol polymer reacts readily with water. Such fibers may be obtained from Kuraray Inc., Osaka, Japan.

In one preferred embodiment for water-based pills the flexible fiber may be an inorganic mineral fiber largely composed of CaO and SiO$_2$, and also typically containing significant amounts of Al$_2$O$_3$, MgO, and Fe$_2$O$_3$, commonly coated with a monomolecular film of specially formulated surfactant to ease the separation of fibers when they are added to water (improve the dispersion). Such a fiber is MAGMA™ fiber available from Lost Circulation Specialists, Inc., Casper, Wyo., USA. This fiber is acid-soluble and thermally stable at temperatures up to 1,800 degrees. The specific gravity of those fibers is 2.6 with no tendency to float. MAGMA™ fiber is an inert non-damaging material towards the environment with an LC-50 of one million. MAGMA™ fiber is available in a "fine" form having a length of from about 0.1 to about 4 mm and a "regular" form having a length of from about 4 to about 20 mm with an average length of about 10 to about 16 mm. The fiber diameters of both grades of MAGMA™ fiber ranges from about 5 to about 15 microns with an average diameter of about 7 to about 10 microns. MAGMA™ fibers are obtained as mixtures of multiple sizes. Fiber for use in the Invention may optionally be cut from either form as appropriate.

In another preferred embodiment for water-based pills the flexible fiber may be a biodegradable organic fiber, for example polyvinyl alcohol fibers which are soluble in water at high temperatures. Polyvinyl alcohol is available in a series of compositions that are water-soluble at specific temperatures, and soluble in 15% HCl at high temperatures. In highly alkaline media, dissolution of fibers occurs at higher temperatures (approximately 10° C. above the dissolution temperature in neutral water). A preferred mixture of flexible fibers is a blend of two different lengths of fibers made with the same polymer, blended so that they have a length ratio of from about 2 to about 6. Such fibers may be blended at a ratio of about 10:90 wt/wt % to about 90:10 wt/wt % of the fibers of different lengths.

In various preferred embodiments for water-based pills, the flexible fiber is a short cut organic wet pulp type polyaramid material, available as "wet pulp" containing about 4 to 7 percent water or as "yarn", each having a dispersant finish, and suitable for use in aqueous media, for example TWARON™ polyaramid obtained from Teijin, having a broad range of short fiber lengths; the blend of fiber contains two fibers in which the rigid fiber is a non-water-soluble rigid polyvinyl alcohol fiber and the second fiber is an inorganic fiber, for example MAGMA™; the blend of fibers contains two fibers in which one fiber is a non-water-soluble rigid polyvinyl alcohol fiber and one fiber is a water-soluble polyvinyl alcohol fiber that is soluble at high temperature and the length ratio of the rigid to the flexible fibers is from about 1 to about 3; the blend of fibers is a blend of three fibers in which one is a rigid fiber that is non-water-soluble polyvinyl alcohol fiber and the other two fibers are short cut polyvinyl alcohol fibers as previously described having different lengths, with length ratios of the flexible fibers ranging between about 2.5 and about 7; the preferred length of the rigid fiber, for example non-water-soluble polyvinyl alcohol fibers, is about 12 mm and the preferred length of the flexible fiber, for example water-soluble polyvinyl alcohol, is between about 1.5 mm and about 6; and the blend of fibers contains two fibers in which the rigid fiber is non-water-soluble polyvinyl alcohol fiber and the other organic fiber is TWARON™ polyaramid "wet pulp" suitable for an aqueous environment.

Other fibers may be used. Laboratory tests should be performed to ensure compatibility with the pill fluid and the drilling fluid, that the pill fluid can transport the fibers at the pumping rates used, and suitability for the size of the openings in the fluid loss pathways to be plugged. Non-limiting examples of other suitable fibers include metals, painted metals, polymer-coated metals, hollow metals, hollow painted metals, hollow coated metals, polypropylene, polyethylene, polyester, polyamide, polylactic acid, polyglycolic acid, polyolefin, novoloid such as phenol-aldehyde, nylon, rayon, extruded mineral wool as described in U.S. Pat. No. 6,790, 812, carbon, basalt, asbestos, and glass. Metallic fibers are particularly suitable at high temperatures and in high density muds. Suitable wetting agents may be used to ensure that the materials are oil-wettable in oil-based muds or water-wettable in water-based muds.

In another embodiment, in particular at high temperatures, the rigid fibers may be made of metal that may be coated or non-coated, and the flexible fibers may be fine extruded flexible fibers or, for example, MAGMA™ fiber. The rigid metallic fibers may optionally be hollow, ribbon-shaped or cylindrical, and the short flexible fibers may optionally be fiber mesh.

Some fibers other than metal fibers may be used at high temperatures, for example in steam injection wells. Some rigid polyaramid fibers, for example, retain 100 percent of their strength up to 140° C. and 50 percent of their strength up to 175° C. Some polyaramid particles may be used in blends of particles at very high temperatures. For example, the decomposition temperature of some polyaramid particles is up to about 450° C.

Various additives required to prepare water-based formulations may be included in the water-based pill of the Invention, for example antifoam agents, defoamers, viscosifiers, weighting agents, extenders, fluid loss additives, and retarder.

The present invention may be further understood from the following examples.

EXPERIMENTAL

Effects of Fibers and Rubber on Deformation of Mud Cakes:

The mud used to prepare the mud cakes for Examples 1 and 2 was a bentonite mud having a density of 1.65 kg/L (13.8 ppg). It contained 412.5 g/L of bentonite gel (which in turn was 85.6 kg/m$^3$ (30 lb/bbl) bentonite in water) and 830 g/L of barite in water.

Water-based muds were prepared, allowed to sit for two hours, and then were sheared before addition of any particles or fibers for 10 minutes in a Hamilton Beach mixer (traditionally used for mud preparation for less than 500 mL). Note that the mud was fresh. The muds were not aged because it was assumed that in the field, when mud losses occur, a treatment fluid will be prepared at the site and probably not aged for very long so that it can be used to cure the losses quickly. In any case, the particle sizes of mud additives are not suitable for effective blockage. The mud was then inspected to assure proper blending and proper homogeneity of the mud. Solids were then added with a Heidolph mixer. The rpm was adjusted so that a vortex was observed; 500 rpm was usually suitable. In the first step, typically 10 grams of solid blend was added to 300 mL over the course of 2 minutes to the mud samples. (Different volumes were occasionally used because of the limitations of certain muds.) The solids were then mixed with the mud for 10 minutes. In the second step, fibers were added to the blend over the course of 2 minutes and left to be blended for an additional 10 minutes for complete dispersion. Checking of the homogeneity of the entire blend is mandatory.

The mud cakes were prepared in a cell under a pressure of 10 bar (a little above the 100 psi (6.90 bar) pressure used in the API Fluid Loss test for mud (ARTC-LP-070)). The prepared mud cakes were tested by an injection test to evaluate the mud cakes' resistance to deformation and their injectability into a small opening. These properties were measured by testing the mud cakes' resistance to deformation as the result of force exerted on the mud cakes to deform and inject them into a narrow tip. An increase in the energy required to deform a mud cake is related to an increase in the strength of the mud cakes' structure. The sampling equipment for the injection tests was a 5 mL syringe having a metallic piston; the tip of the syringe was removed and replaced with a threaded tip having an internal hole with nominal dimensions of 4.15 mm diameter and 33.30 mm length. With the piston in the syringe but the threaded tip not on, the open end of the syringe was gently pushed into the mud cake so that mud cake entered the syringe and pushed up the piston. The threaded tip was then placed on the syringe after the mud cake was in place. The syringe was then mounted in a frame for stability and pressure was slowly exerted on the piston with a device that could measure the force as a function of time and distance. The force compressed the sample and the mud flowed into the threaded tip; filling of the tip was assured by loosely placing a small screw having a hole in the middle (approximately 2.1 mm) on the end of the threaded tip to produce an additional resistance for the mud cake, causing the mud cake to occupy the entire volume of the tip. After ensuring proper filling of the tip, the screw was removed and the process was continued. As the piston moved downward and approached the bottom of the syringe, the pressure in the tip was increased steadily up to the measurement limit of 800 N.

EXAMPLE 1

Fibers

Mud cakes were made with this mud and with the addition of one or the other of two types of flexible fiber to this mud. The fibers used with this mud for preparation of mud cakes were glass fibers (about 20 microns in diameter) cut in the laboratory into approximately 1 to 2 mm lengths, and "regular" MAGMA™ fiber. The amounts of the MAGMA™ fiber and glass fiber added to the mud in two experiments were 14.98 and 14.27 kg/m$^3$ (5.25 and 5.00 lb/bbl), respectively.

FIG. 1 shows the injection profile and the force required to inject mud cake samples, made from the bentonite mud with and without glass or MAGMA™ fiber, into a narrow tip. Mud cake made from the bentonite mud was injected much more easily into the tip than the mud cakes that contained fibers. The mud cake that contained "regular" MAGMA™ fiber required more force to be injected into the tip in comparison to the mud cake containing the glass fibers. The presence of different lengths of the MAGMA™ fibers (in the as-received material) with their small diameters was responsible for the creation of a stronger three-dimensional structure and greater heterogeneity in the mud cake compared to the mud cake made with the glass fibers. All of the injection profiles showed plateaus. Not intending to be limited by theory, it is believed that an approximately horizontal plateau indicates either shearing of successive layers of the sample or a combination of simultaneous shearing, extrusion and adhesion. Less reproducibility was observed with the mud cakes containing the MAGMA™ fiber because of the very random distribution of fibers and their orientation. The glass fibers had a more uniform length. Longer lengths of glass fibers (10 mm) were tried but were not injectable through the small nozzle being used; therefore the resistance increased with the length of the fiber.

EXAMPLE 2

Rubber

Ground rubber was added to the same mud in amounts of either 1.38 weight percent or 7.61 weight percent (designated samples R1 and R4 respectively). When mud cakes were made with these two samples using the apparatus and method described above, the mud cakes contained about 6 and about 23 volume percent rubber respectively. The rubber used had about 10 percent by volume of particles smaller than about 92 to about 205 microns, about 50 percent by volume of particles smaller than about 288 to about 422 microns, and about 10 volume percent of particles larger than about 532 to about 748 microns. The rubber contained about 28 to 33 weight percent carbon black.

Figure 2:
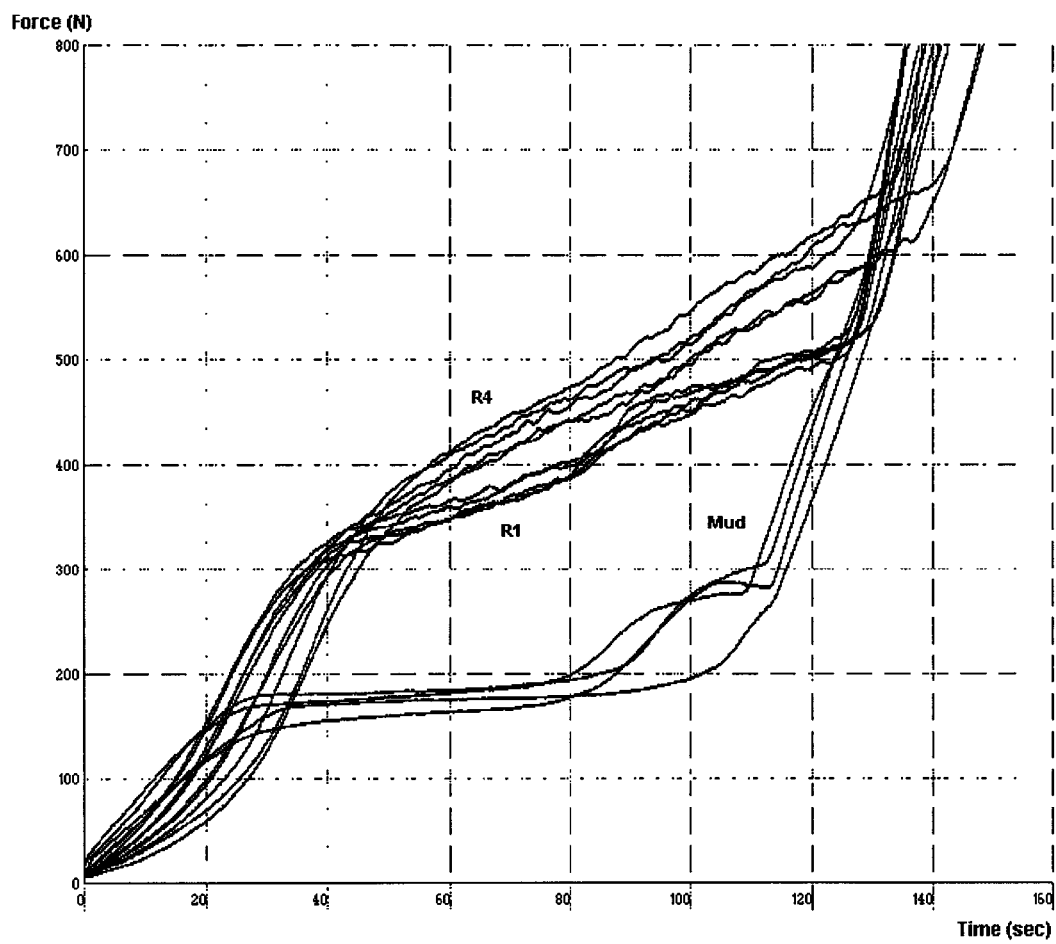
FIG. 2 illustrates the injection force required to deform mud cakes formed by a bentonite mud cake and bentonite mud cakes prepared with different amounts of added rubber.

FIG. 2 shows the injection profile and the force required to inject mud cake samples, made from the bentonite mud with the two rubber contents into a narrow tip. Mud cake made from the bentonite mud was injected much more easily into the tip than the mud cakes that contained rubber. The mud cake that contained more rubber required more force to be injected into the tip in comparison to the mud cake containing less rubber.

Figure 3:
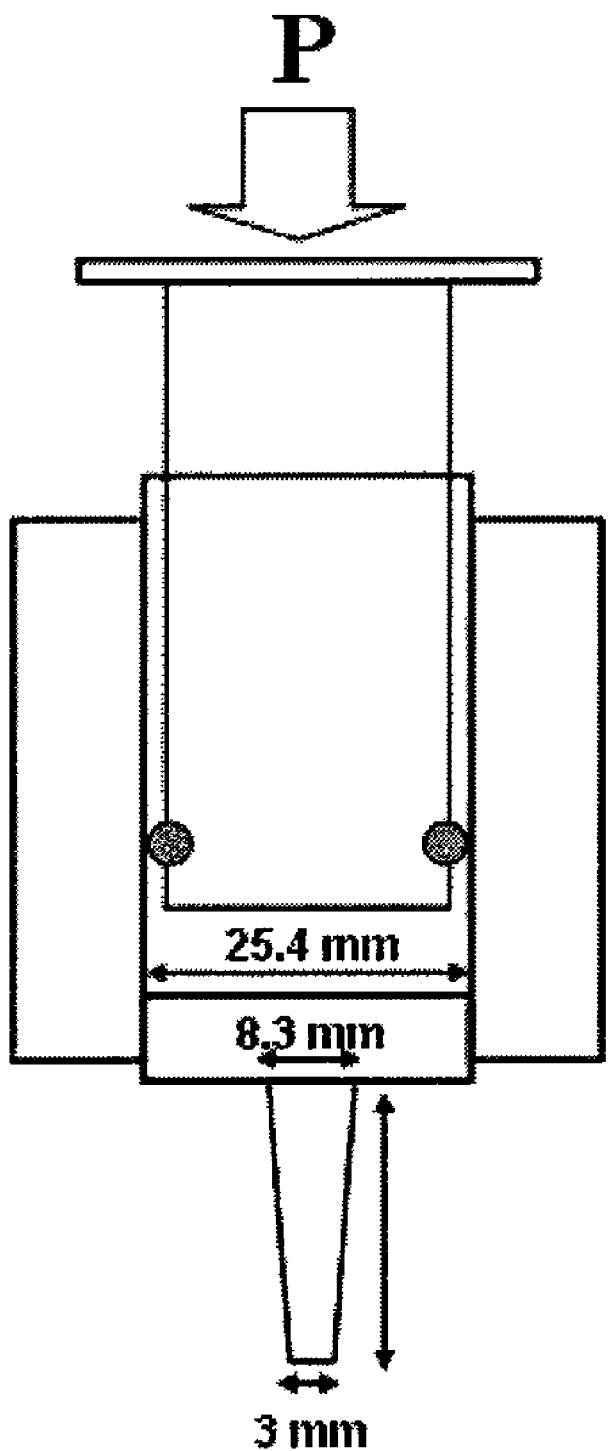
FIG. 3 shows the piston apparatus used to study plugging by pills of the Invention.

Effects of Fiber and Blends of Particles and Rubber on Plugging by Mud Cakes:

The plugging effect was studied with a 60 ml syringe, as shown in FIG. 3. The piston was removed and the syringe was filled with a water-based mud slurry without removing a cover that was placed on the end of the tip. Then the cover was removed and the piston put in place and pushed manually until a filter cake formed and blocked the tip; the solids in the water-based slurry were deliberately designed so that the filter cake leaked. Then the piston was removed and the syringe was filled with the oil based mud. The piston was pushed manually until there was complete invasion of the oil-based mud through the blocking filter cake. The syringe was then placed into a 60° C. oven with the piston in place and observed periodically for leakage by pushing on the piston. Note that the particle size distribution was not optimized in these experiments so that there was an increased likelihood of leaking.

The tests were performed with a 1.14 kg/L (9.50 ppg) water-based mud. The water-based mud was composed of 3.4 g/L FLOVIS™ xanthan viscosifier available from M-I Swaco, 10.86 g/L DUALFLO™ modified starch available from M-I Swaco, 3.15 g/L magnesium oxide, 31 g/L KCl, 40 g/L HYMOD PRIMA™ ball clay available from Imerys Minerals, Par, England, and was weighted with Barite.

The oil-based mud was VERSATEC™, available from MI SWACO (Houston, Tex. USA) with a density of 11.93 ppg (1.43 SG). This drilling fluid is 30 to 60% petroleum distillate, 5 to 10% emulsifier, 1 to 5% calcium chloride, and 1 to 3% lime. The oil:water ratio in this mud was 80:20. The mud contained 618 g/l EDC™ 95-11 hydrotreated middle petroleum distillate drilling fluid available from Total Special Fluids, Paris La Défense Cédex, France, 28 g/l PARAMUL™ primary emulsifier (MI SWACO), 8 g/l PARAWET™ emulsifier (MI SWACO), 25 g/l BENTONE™ 128 viscosifier (available from Elementis Specialties, Diegem, Belgium), 25 g/l lime, 10 g/l VERSATROL™ HT gilsonite (MI SWACO), 65 g/l CaCl$_2$ and 174 g/l fresh water and was weighted with barite to the desired density.

EXAMPLE 3

A blend of solid particles was added to the water-based mud. The blend of solid particles consisted of 47.14 weight percent coarse calcium carbonate having a particle size up to about 1200 microns, 7.86 weight percent rubber, 30 weight percent medium calcium carbonate particles having an average particle size of about 130 microns, and 15 weight percent fine calcium carbonate particles having an average particle size of about 10 microns (MIKHART™ 10 available from, M-I Swaco, Houston, Tex. USA). The blend was added to the mud in an amount of 18.54 kg/m$^3$ (6.5 lb/bbl). After addition of the blend, the Solid Volume Fraction of the water-based mud increased to 5.1 percent.

To the water-based mud (containing the solid particles), was then added 3.20 kg/m$^3$ (1.12 lb/bbl) polyvinyl alcohol fibers soluble in water at high temperature, half of which had a length of about 1.5 mm and half of which had a length of about 6 mm (KURALON™ WN8 fiber mixture available from Kuraray, Osaka, Japan) and 5.70 kg/m³ (2 lb/bbl) non-water-soluble polyvinyl alcohol having a length of about 12 mm (KURALON™ RF400 fiber available from Kuraray, Osaka, Japan).

Leakage of the oil-based fluid through the blocked tip was checked periodically. After 24 hours, oil-based fluid was still leaking through, although the leakage was very low. One minute of pushing on the piston produced one small drop of mud.

EXAMPLE 4

A blend of solid particles was added to the water-based mud. The blend of solid particles consisted of 29.25 weight percent coarse calcium carbonate having a particle size of up to about 1200 microns, 23.85 weight percent rubber, 18.98 weight percent medium particles of TWARON™ 5001 polyaramid polymer powder made of poly-paraphenylene-terephthalamide having a bulk density of about 325 kg/m³, 18.61 weight percent medium calcium carbonate particles having an average particle size of about 130 microns, and 9.31 weight percent fine calcium carbonate having an average particle size of about 10 microns (MIKHART™ 10 available from, M-I Swaco, Houston, Tex. USA). The blend was added to the mud in an amount of 18.54 kg/m³ (6.5 lb/bbl). After addition of the blend, the Solid Volume Fraction of the water-based mud increased to 5.9 percent.

To the water-based mud (containing the solid particles), was then added 3.20 kg/m³ (1.12 lb/bbl) polyvinyl alcohol fibers soluble in water at high temperature, half of which had a length of about 1.5 mm and half of which had a length of about 6 mm (KURALON™ WN8 fiber mixture available from Kuraray, Osaka, Japan) and 5.70 kg/m3 (2 lb/bbl) non-water-soluble polyvinyl alcohol having a length of about 12 mm (KURALON™ RF400 fiber available from Kuraray, Osaka, Japan).

Leakage of the oil-based fluid through the blocked tip was checked periodically. Invasion into the blocking material was slow. After less than 2 hours the flow had stopped. The leakage was checked every hour and no further leakage was observed. The composition was checked in 24 hours and no leakage was observed even when high pressure (7-10 bar) was applied. The piston could not be removed from the syringe, and suction could not remove the blocking material.

The Invention is applicable to wells of any orientation. The Invention may be used for wells for production of hydrocarbons or other fluids, such as water or carbon dioxide, or, for example, for injection or storage wells.

Having thus described my invention, I claim:

1. A water-based composition for reducing lost circulation while drilling a well with an oil-based drilling mud, the composition comprising an aqueous base fluid, a mixture of coarse, medium and optional fine particles, and a blend of long polyvinyl alcohol fibers and short inorganic fibers, wherein at least a portion of the medium particles or coarse particles or both swells in the presence of the oil-based drilling mud.

2. The composition of claim 1 wherein the optional fine particles have an average particle size of from about 5 to about 15 microns, the medium particles have an average particle size of from about 20 to about 150 microns, and the coarse particles have an average particle size of from about 300 to about 2500 microns.

3. The composition of claim 1 wherein the mixture of particles comprises from about 0 to about 15 weight percent fine particles, about 20 to about 40 weight percent medium particles, and about 40 to about 60 weight percent coarse particles.

4. The composition of claim 1 wherein at least about 60 weight percent of the mixture of particles is acid-soluble.

5. The composition of claim 1 wherein the long fibers are rigid and the short fibers are flexible.

6. The composition of claim 1 wherein the weight ratio of long fibers to short fibers is from about 1:4 to about 4:1.

7. The composition of claim 1 wherein at least a portion of the fibers is acid-soluble.

8. The composition of claim 1 wherein the long fibers comprise water-insoluble polyvinyl alcohol.

9. The composition of claim 1 wherein the short fibers comprise a mixture of fibers of two different lengths.

10. The composition of claim 1 wherein the aqueous base fluid is a drilling mud.

11. The composition of claim 1 wherein the short fibers comprise a metal.

* * * * *